United States Patent
Keller et al.

(10) Patent No.: US 8,436,278 B2
(45) Date of Patent: May 7, 2013

(54) METHOD FOR JOINING TWO ROTATIONALLY SYMMETRICAL METAL PARTS BY TUNGSTEN INERT GAS (TIG) WELDING, AND A DEVICE FOR CARRYING OUT THE METHOD

(75) Inventors: Sorin Keller, Oberrohrdorf (CH); Werner Balbach, Würenlingen (CH)

(73) Assignee: ALSTOM Technology Ltd., Baden (CH)

( * ) Notice: Subject to any disclaimer, the term of this patent is extended or adjusted under 35 U.S.C. 154(b) by 369 days.

(21) Appl. No.: 12/708,720

(22) Filed: Feb. 19, 2010

(65) Prior Publication Data
US 2010/0224597 A1 Sep. 9, 2010

(30) Foreign Application Priority Data
Mar. 3, 2009 (CH) ..................... 0320/09

(51) Int. Cl.
*B23K 9/095* (2006.01)
*B23K 9/12* (2006.01)
*B23K 9/16* (2006.01)
(52) U.S. Cl.
USPC ............. 219/137 R; 219/61; 219/125.11
(58) Field of Classification Search ........ 219/59.1–67, 219/76.1–120, 121.11–144
See application file for complete search history.

(56) References Cited

U.S. PATENT DOCUMENTS 4,219,717 A * 8/1980 Kuhnen ............... 219/61
4,298,784 A * 11/1981 Schmall ............ 219/124.02
4,442,334 A * 4/1984 Lux et al. ............. 219/73
4,450,339 A * 5/1984 Corby, Jr. ........... 219/124.34
4,532,406 A 7/1985 Povlick et al.
(Continued)

FOREIGN PATENT DOCUMENTS

| DE | 2633829 | 1/1978 |
|---|---|---|
| EP | 0665079 | 8/1995 |
| EP | 0870567 | 10/1998 |
| EP | 1810772 | 7/2007 |
| GB | 2142859 | 1/1985 |
| JP | 59-73181 | 4/1984 |
| JP | 9-285867 | 11/1997 |

OTHER PUBLICATIONS

Search Report for Swiss Patent App. No. 0320/2009 (Jul. 8, 2009).

*Primary Examiner* — Robert J Hoffberg
*Assistant Examiner* — Eric Ward
(74) *Attorney, Agent, or Firm* — Cermak Nakajima LLP; Adam J. Cermak (57) ABSTRACT

In a method for joining two, in particular rotationally symmetrical, metal parts (1, 2) by a tungsten inert gas (TIG) welding process, in a first step, the two metal parts (1, 2) to be joined are initially positioned relative to one another by a centering offset (7) in such a way that a narrow gap (4) is formed between them and a relief region (8) is created in the seam-bottom area. In a second step, the flanks (5, 6) of the metal parts (1, 2), which delimit the narrow gap (4), are joined together by welding beads (10) which fill the narrow gap (4), with a predetermined melt-through point (9) being formed. High-quality automatic welding is achieved in that the narrow gap (4) has a continuously constant width (a), in that the width (a) of the narrow gap (4) is selected such that the welding beads (10) lying one above the other each extend over the entire width (a) of the narrow gap (4), and in that the entire narrow gap (4) is filled with the welding beads (10) in fully automatic fashion.

14 Claims, 5 Drawing Sheets

U.S. PATENT DOCUMENTS

| | | | |
|---|---|---|---|
| 4,617,444 A | | 10/1986 | Engelhard et al. |
| 4,948,938 A | * | 8/1990 | Vignes .................... 219/121.14 |
| 5,532,454 A | * | 7/1996 | Kuhnen ................... 219/137 R |
| 5,670,072 A | * | 9/1997 | Offer et al. ............... 219/137 R |
| 5,981,897 A | * | 11/1999 | Offer et al. ..................... 219/75 |
| 6,046,431 A | * | 4/2000 | Beattie .................... 219/124.34 |
| 6,563,074 B2 | * | 5/2003 | Bazukuri et al. ......... 219/121.14 |
| 2002/0079303 A1 | * | 6/2002 | Offer et al. ............... 219/137 R |
| 2006/0201915 A1 | | 9/2006 | Obana et al. |
| 2008/0210677 A1 | * | 9/2008 | Nakamura et al. ........ 219/137 R |
| 2010/0140230 A1 | * | 6/2010 | Schreiber et al. ........ 219/121.14 |
| 2010/0224595 A1 | * | 9/2010 | Choi ............................ 219/59.1 |

* cited by examiner

METHOD FOR JOINING TWO ROTATIONALLY SYMMETRICAL METAL PARTS BY TUNGSTEN INERT GAS (TIG) WELDING, AND A DEVICE FOR CARRYING OUT THE METHOD

This application claims priority under 35 U.S.C. §119 to Swiss application no. 00320/09, filed 3 Mar. 2009, the entirety of which is incorporated by reference herein.

BACKGROUND

1. Field of Endeavor

The present invention deals with the field of welding engineering. It relates to a method for joining two, in particular rotationally symmetrical, metal parts by a tungsten inert gas (TIG) welding process. The present invention also relates to a device useful for carrying out the method.

2. Brief Description of the Related Art

EP-A1-0 665 079 describes narrow-gap TIG welding for joining materials by a low-volume weld seam, this document focusing on the geometry of the seam. Here, the welding process is usually only monitored by direct visual inspection. Other users of narrow-gap TIG welding monitor the welding process using a video camera mounted externally on one side (outside the welding torch and outside the narrow gap). This affords only a restricted monitoring possibility, which limits the depth of the weld.

EP-A1-1 810 772 describes an inert gas supply for narrow-gap TIG welding, having a reduced quantity of inert gas in two streams of gas which protect the electrode and the entire guiding system. Here, monitoring in the direct vicinity of the arc is only possible visually. An increasing seam depth greatly restricts precise assessment of the seam quality. A fully automatic welding process is not described in this document and, indeed, cannot be implemented under these conditions. The method can be applied particularly effectively to the joining of rotationally symmetrical bodies in the construction of heavy machines such as, for example, rotors of turbomachines. Thick-walled components which are accessible only from one side, and therefore also cannot be welded on the root side, can also be effectively joined using the method described above.

Figure 1:
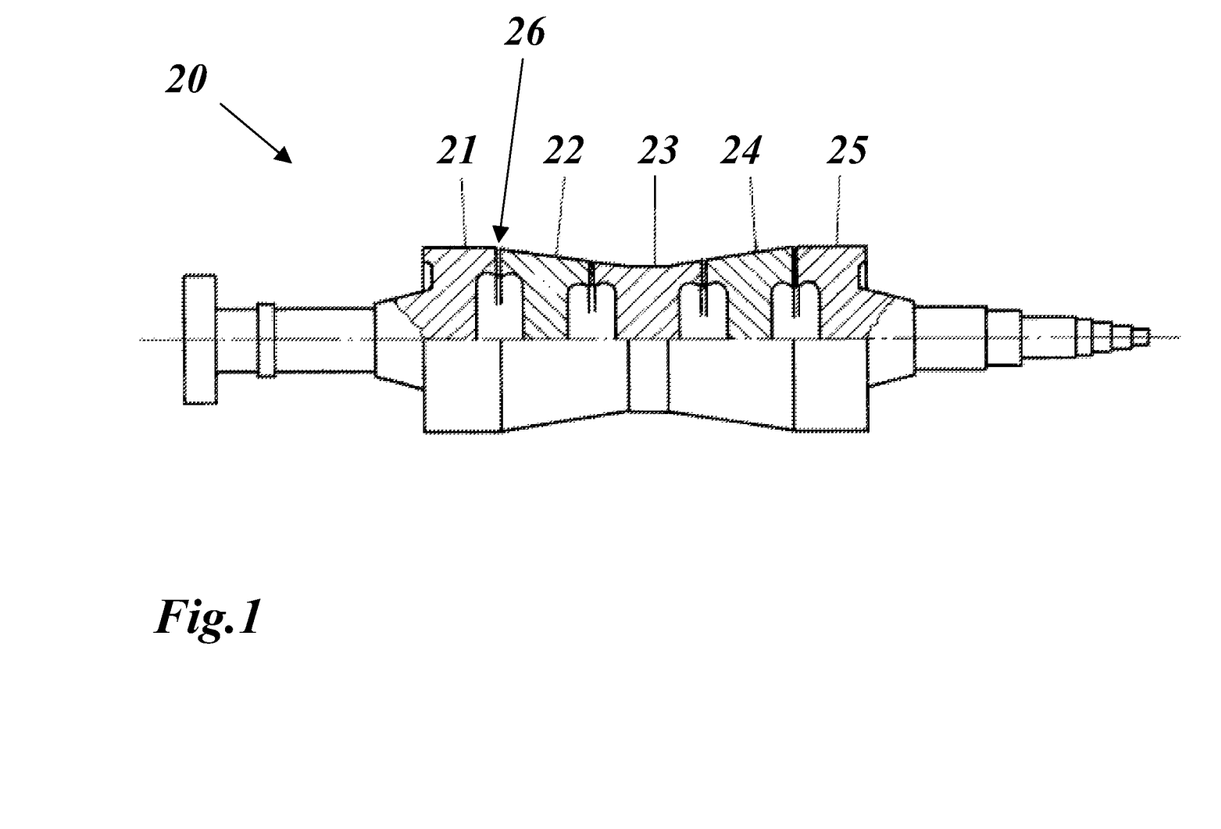
FIG. 1 shows a partially sectional side view of a turbomachine rotor which is welded together from a plurality of rotor disks and is a preferred application for methods according to the invention.

A preferred field of application for the method is the joining of disks and hollow cylindrical forgings used for the construction of rotors for steam and gas turbines, compressors, and for turbo-generators. Such a rotor 20 is shown in FIG. 1. It is composed of a plurality of rotor disks 21, . . . , 25 which are integrally joined to one another by weld seams 26.

The workpiece parts which are to be joined and form a narrow gap may, however, also be welded with or without additional material at their butt joint by a base seam produced by electron-beam, plasma, laser-beam, or argon-arc welding processes. After the base seam, the further seam structure is often completed by submerged-arc welding. The method can be applied particularly effectively to the joining of rotationally symmetrical bodies in heavy machine construction. Thick-walled components which are accessible only from one side, and therefore cannot be rewelded on the root side, can also be effectively joined using the method according to DE-A1-26 33 829. The advantage of this method is that an inclusion-free, fine-grained structure is formed at the joint between the workpiece parts. There is no longer a primary structure either in the welded material or in the heat-affected zone. Subsequent normalizing or quenching and tempering are consequently unnecessary.

The welding process is not automated in any of these methods, and these methods all have the disadvantage that they do not have direct monitoring using one or more video systems directly in the welding nozzle, and therefore have to be monitored manually and do not allow automation for all applications.

SUMMARY

One of numerous aspects of the present invention relates to a welding method for producing low-volume seams of the highest quality, which method can avoid disadvantages of known methods and makes it possible to join even complicated and voluminous workpieces and, in particular, even workpieces which are accessible for the welding process only on one side, in order to achieve higher efficiency, as compared with the prior art, as a result of fully automatic welding. Another aspect includes a device for carrying out the method.

Yet another aspect of the present invention includes that the narrow gap has a continuously constant width, that the width of the narrow gap is selected such that the welding beads lying one above the other each extend over the entire width of the narrow gap, and that the entire narrow gap is filled with the welding beads in a fully automatic fashion. For this purpose, use is preferably made of a narrow gap having a width which is less than or equal to 12 mm and, in particular, is in the range of 8-12 mm.

One refinement includes that the relief region has a width and a height, and in that the width of the relief region is about 3 times its height.

Another refinement includes that the height of the narrow gap is 2 times its width, but is at least 12 mm.

According to a further refinement, for the TIG welding process, use is made of a welding wire, the diameter of which is between one-tenth and one-fifth of the width of the narrow gap, but is at least 0.8 mm and at most 1.2 mm, if the metal parts to be joined are formed of a typical rotor steel.

Another refinement includes that, for the TIG welding process, the metal parts are preheated to elevated temperatures, preferably above 200° C., and, during welding, work is carried out with current intensities in the range of 140 A to 300 A at a feed rate of 50 mm to 200 mm per minute, depending on the preheating temperature.

According to another refinement, the inert gas used during the TIG welding process is argon or argon with at most 3% hydrogen or an argon/helium mixture having 30-70%, preferably 50%, argon, remainder helium, or an argon/nitrogen/hydrogen mixture.

Yet another refinement includes that the metal parts to be joined are rotationally symmetrical, in that the metal parts are arranged one above the other during welding and are rotated about a vertical axis, and the welding is carried out using a welding tongue which is designed to be moveable in the radial and vertical directions.

A device embodying principles of the present invention, useful for carrying out the method, includes a welding tongue which can be positioned and operates automatically, is in the form of a narrow-gap welding torch, is intended for the TIG welding process, and has an integrated video system for monitoring the welding by video. The integrated video system makes it possible to carry out automatic welding in the narrow gap.

One preferred refinement of the device includes that the integrated video system includes two video units, the tungsten electrode being arranged therebetween in such a manner that the video system can be used to visually monitor the tungsten electrode, the arc, the molten bath, the welding wire supply, and the flank wetting. Here, welding wire is supplied automatically by advantageously integrating a wire-guiding system in the welding tongue.

Another refinement of the device includes that the welding tongue has a ceramic flat nozzle for the supply of inert gas. The ceramic flat nozzle is preferably optimized for a minimum inert gas consumption of about 8 l/min.

It is particularly favorable if the video system is accommodated in the ceramic flat nozzle in such a way that the inert gas is simultaneously used for cooling the video system.

For automatic operation, it is also advantageous if a device for determining the position of the welding tongue in the narrow gap is arranged in the welding tongue. The device for determining the position of the welding tongue preferably includes an integrated capacitive and/or laser measuring system.

Another refinement of the device includes that the metal parts to be joined can be rotated about a vertical axis, and in that the welding tongue can be moved automatically in the vertical and radial directions.

BRIEF DESCRIPTION OF THE DRAWINGS

The invention will be explained in more detail below with reference to exemplary embodiments in conjunction with the drawing, in which.

DETAILED DESCRIPTION OF EXEMPLARY EMBODIMENTS

Figure 3:
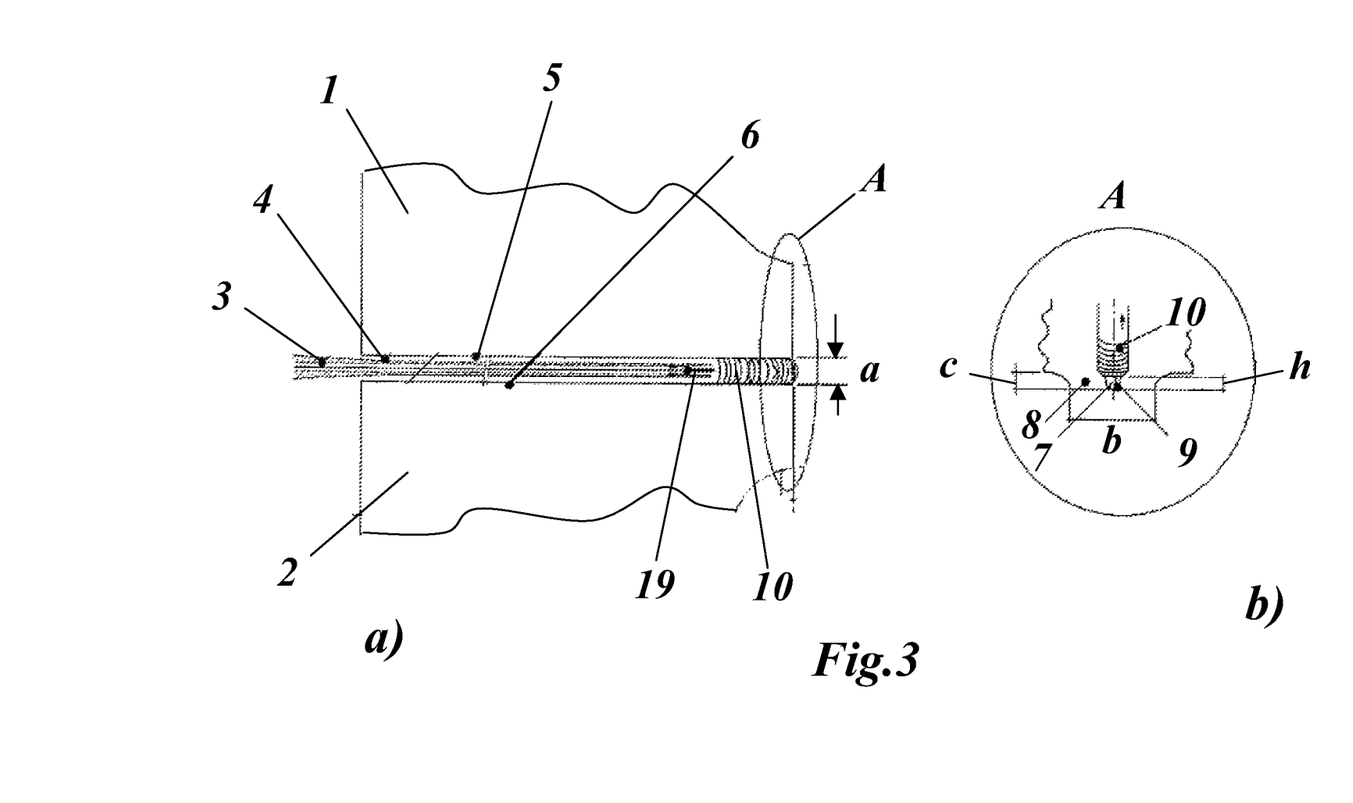
FIG. 3 shows, in two subfigures, the welding tongue of the invention inserted into a narrow gap in a configuration according to FIG. 2 (FIG. 3a) and an enlarged detail from the bottom end of the narrow gap (FIG. 3b)

In an exemplary method embodying principles of the present invention, according to FIG. 3, the metal parts 1 and 2 to be joined have a narrow gap 4 and a centering offset 7. The two metal parts 1 and 2 are initially positioned relative to one another by this centering offset 7 (FIG. 3b). A relief region 8 is formed in the seam-bottom area such that, during welding, a predetermined melt-through point 9 is formed and the workpiece flanks 5 and 6, which are formed by the narrow gap (FIG. 3a), are joined together by the fully automatic tungsten inert gas (TIG) welding process by multi-pass welding beads 10 which each extend over the entire width of the narrow gap 4. The advantages of this procedure are, inter alia, that the narrow gap 4 can be welded in a fully automatic fashion and therefore a high efficiency of the method is achieved.

In particular, weld seams of the highest quality are produced, and therefore it is not necessary to carry out subsequent heat treatment of the joined workpieces 1, 2. This particularly advantageously makes it possible to join together individual parts which are accessible only from one side for the welding process. In this case, it is particularly expedient if use is made of a relief region 8 having a width b which is about three times its height c (FIG. 3b). This ensures that undercuts arising during welding occur on both sides of the melt-through bead, and therefore only outside the bearing cross section. Furthermore, it is advantageous if use is made of a narrow gap 4 (8-12 mm wide), the height of which is two times its width a, but is at least 12 mm. Since the heat input continues to increase with an increasing width of the weld seam, it is only possible with these dimensions also to weld the last welding bead 10 in only one pass, and this makes it possible to fully automate the method.

Finally, during the TIG welding process, use is advantageously made of a welding wire, the diameter of which is one-fifth to one-tenth of the width a of the narrow gap 4, but is at least 0.8 mm and at most 1.2 mm in the case of the typical rotor steels. This provides reliable wire guidance and a good welding result. In addition, during the TIG welding process, work is advantageously carried out with current intensities in the range of 140 A to 300 A at a feed rate of 50 mm to 200 mm per minute, depending on the preheating temperature, which in the case of the typical rotor steels is preferably above 200° C. Finally, it is advantageous if the inert gas used is argon or argon with at most 3% hydrogen or an argon/helium mixture having 30 to 70%, preferably 50%, argon, remainder helium, or an argon/nitrogen/hydrogen mixture. This makes it possible to produce weld seams of outstanding quality.

The outline of the seam (FIG. 3) schematically shows the cross section through the workpieces 1, 2 to be joined in the region of the weld seam. On that side which is inaccessible for the welding (for example the inner side of hollow bodies as are found in welded rotors), the metal parts 1 and 2 to be joined butt against one another at the centering offset 7 and are positioned relative to one another. As already described, the relief region 8 is formed in the seam-bottom area in such a way that, during welding, the predetermined melt-through point 9 is produced, and therefore melting of the centering offset 7 is forcibly achieved during welding. Undercuts then only occur on both sides of the melt-through bead, whereas the bearing cross section does not have any undercuts, which has a very favorable effect on the stress behavior of the material.

In this exemplary embodiment, the centering offset 7 has a height h of 5 mm, the relief region 8 has a width b of 40 mm overall, and a height c of at least 12 mm. On account of these geometric dimensions, the melting of the centering offset 7 is achieved with closely toleranced welding-data ranges. The parallel workpiece flanks 5, 6 in the narrow gap 4 having a width a of, in this exemplary embodiment, 9.4 mm and a height c of about 12 up to 400 mm to the external surfaces of the workpiece, are joined by fully automatic TIG welding. In the process, the welding beads 10 extend from one workpiece flank 5 to the opposite workpiece flank 6 and therefore in each case fuse both workpiece flanks. Once the arc has been positioned, a change is no longer necessary, and therefore the welding operation can proceed automatically. As already mentioned further above, a welding wire having a diameter of 0.8 to 1.2 mm is used during this TIG welding. Work is carried out with current intensities in the range of 140 to 300 A at a feed rate of 50 to 200 mm per minute, depending on the preheating temperature. The inert gas used is argon. A mixture of argon and at most 3% hydrogen, or a mixture of argon and 30 to 70% helium, can of course also be used in other exemplary embodiments, optimum results being achieved when using the same proportions of argon and helium. The entire narrow gap 4 is filled with the welding beads in a fully automatic fashion.

A method embodying principles of the present invention can be applied to both rotationally symmetrical bodies and other thick-walled metal parts, in particular to those which are accessible only from one side and cannot be rewelded on the root side, for example plates, pipes, disks and hollow cylinders of low- or high-alloy metallic materials. The TIG welding can be combined with submerged-arc welding (SAW) by first carrying out TIG welding and then filling the rest of the seam using SAW. The seam should be widened in the SAW region. The method includes complete TIG welding.

A preferred field of application is the production of rotors of energy-converting machines, which are composed of individual rotary bodies having hollow spaces or turned recesses at the end face, for example, of disk-shaped or hollow cylindrical forgings of identical strength or identical thickness. These forgings are first of all vertically joined in the "root region", i.e., in the region of the centering offset 7, by the TIG welding process described above. So that the rotor does not buckle in the process, the first seam must have a certain depth. Here, this height is preferably about two times its width a, and is at least 12 mm.

Figure 4:
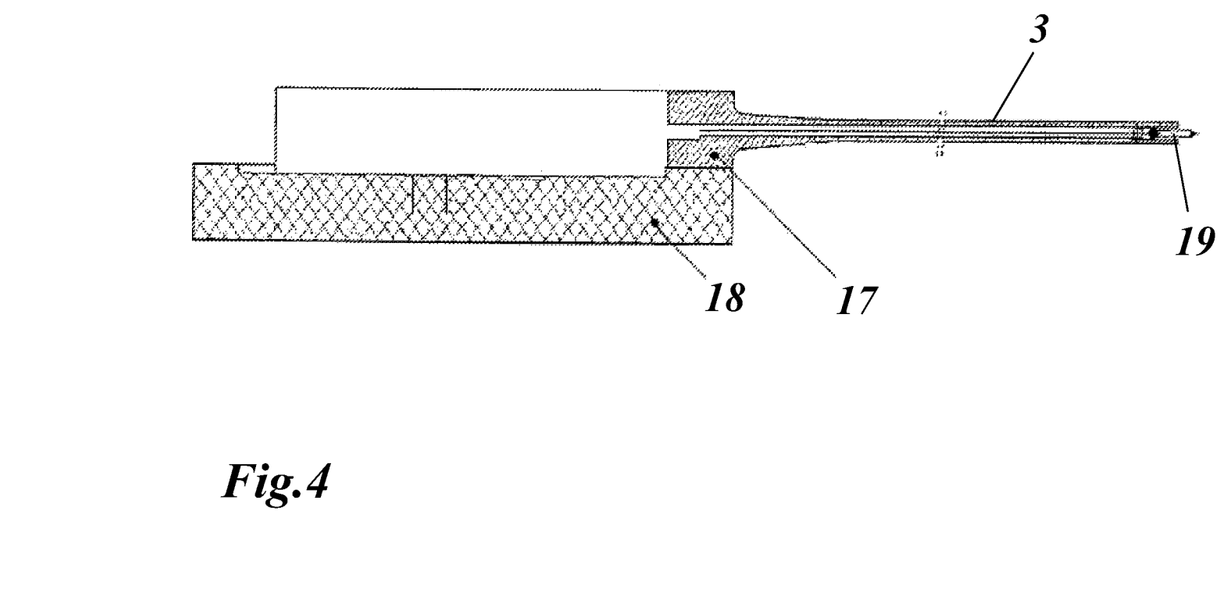
FIG. 4 shows a side view of a welding tongue mounted on a support plate, according to an exemplary embodiment of the invention.

The method described can be carried out using a narrow-gap welding torch with automatic positioning, monitoring of all the welding parameters, and integrated dual video monitoring of the welding. FIG. 4 shows a side view of a corresponding welding tongue 17 which is mounted on a support plate 18 and has a flat, thin tongue tip 3, with which the welding tongue 17 can be inserted into the narrow gap 4 (see FIG. 3a).

Figure 5:
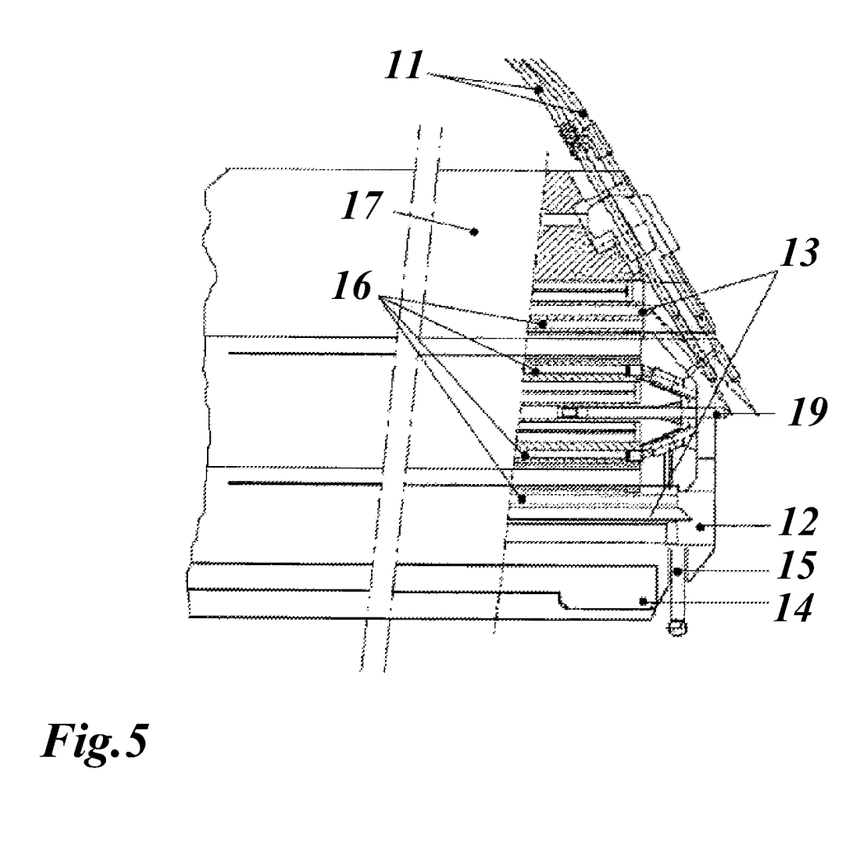
FIG. 5 shows a plan view from above of the welding tongue shown in FIG. 4.

FIG. 5 shows a plan view of the welding torch head or the tongue tip 3 of the welding tongue 17. Two spaced-apart video systems 13 are integrated in the welding torch head. The tungsten electrode 19 is positioned between the two video systems 13. The welding wire supply is integrated in the welding torch head by a wire-guiding system 11 and automated. This makes it possible to monitor the arc, tungsten electrode 19, molten bath, welding wire supply, and flank wetting. The welding torch head has a ceramic flat nozzle 12 for the supply of inert gas with special inert gas distribution. The above-mentioned, integrated dual video monitoring with the video systems 13 is also accommodated in the ceramic flat nozzle 12. The flat nozzle 12 is optimized for minimum inert gas consumption. An inert gas consumption of about 8 l/min is sufficient with a flat nozzle 12 as stated, compared to a typical inert gas consumption of 50 to 60 l/min of a standard welding torch when welding rotors.

The welding torch is fully integrated with welding wire guide 11, and also water and inert gas for welding torch cooling. An inert gas supply 16 supplies inert gas for welding. The inert gas is simultaneously used for cooling the video systems 13.

The welding torch described is intended for use in an automatic welding process. For this purpose, according to FIG. 2, the metal parts of a rotor 20 which are to be welded are mounted such that they can rotate about a vertical axis 28 and the welding tongue 17 of a welding torch system 27 is inserted into the narrow gap between the metal parts. The welding torch is automatically positioned in the vertical direction (vertical double-headed arrow in FIG. 2) and in the radial direction (radial double-headed arrow in FIG. 2) by a combination of an integrated capacitive measuring system 14 (for the vertical measurement) and an integrated laser measuring system 15 (for the radial measurement).

Figure 2:
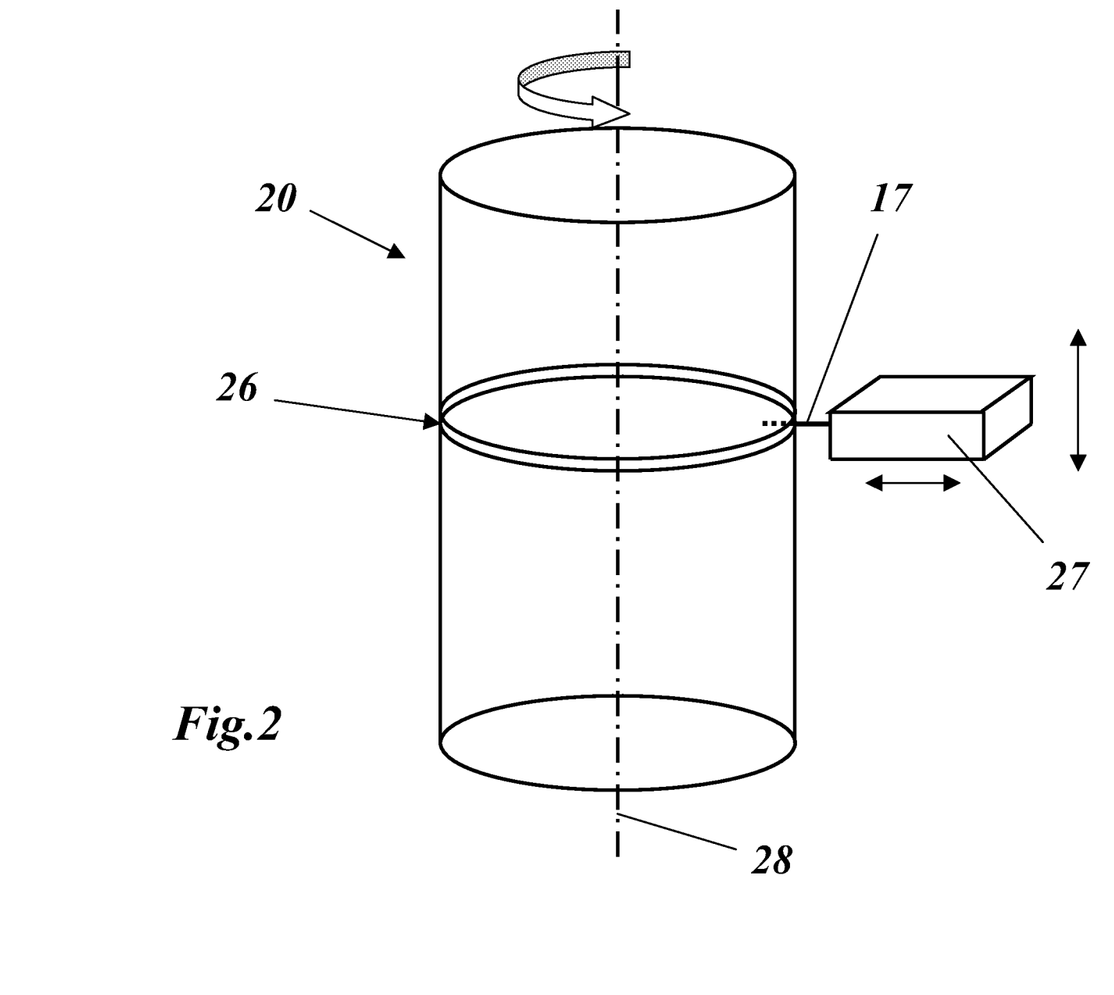
FIG. 2 shows a greatly simplified device for welding two rotationally symmetrical metal parts according to an exemplary embodiment of the invention.

The integrated video system 13 and the full automation of the welding torch make it possible for large rotors of steam and gas turbines to be welded to the required quality by only two welders. Here, two to four welding torches are used at the same time. The integrated video system 13 makes it possible to carry out very good quality narrow-gap TIG welding even in the case of large weld seam depths. During welding, the rotor 20 is positioned vertically and rotated. The welding torches are stationary, but can be positioned and tracked vertically and radially (FIG. 2). The welding torches are struck using a special radio-frequency striking system which is designed so as not to have a negative effect on the seam quality or process automation. The arc length during welding is automatically kept constant by an AVC system (arc-voltage-control system) in the welding torch system 27.

LIST OF REFERENCE SYMBOLS 1,2 Metal part
3 Tongue tip (welding tongue)
4 Narrow gap
5,6 Flank (workpiece)
7 Centering offset
8 Relief region
9 Predetermined melt-through point
10 Welding bead
11 Wire-guiding system
12 Ceramic flat nozzle
13 Integrated video system
14 Integrated capacitive measuring system
15 Integrated laser measuring system
16 Inert gas supply
17 Welding tongue (with integrated water cooling)
18 Support plate
19 Tungsten electrode
20 Rotor
21, . . . , 25 Rotor disk
26 Weld seam
27 Welding torch system
28 Axis
a Width (narrow gap)
b Width (relief region)
c Height (relief region)
h Height (centering offset)

While the invention has been described in detail with reference to exemplary embodiments thereof, it will be apparent to one skilled in the art that various changes can be made, and equivalents employed, without departing from the scope of the invention. The foregoing description of the preferred embodiments of the invention has been presented for purposes of illustration and description. It is not intended to be exhaustive or to limit the invention to the precise form disclosed, and modifications and variations are possible in light of the above teachings or may be acquired from practice of the invention. The embodiments were chosen and described in order to explain the principles of the invention and its practical application to enable one skilled in the art to utilize the invention in various embodiments as are suited to the particular use contemplated. It is intended that the scope of the invention be defined by the claims appended hereto, and their equivalents. The entirety of each of the aforementioned documents is incorporated by reference herein.

We claim:
1. A method for joining two metal parts, the method comprising:
initially positioning the two metal parts to be joined relative to one another separated by a centering offset forming a narrow gap between the two metal parts and creating a relief region in a seam-bottom area, said gap extending to outer surfaces of the two metal parts; and thereafter joining together flanks of the metal parts which delimit the narrow gap with tungsten inert gas welding and forming welding beads which fill the narrow gap, including forming a predetermined melt-through point;

wherein the narrow gap has a continuously constant width (a) between 8-12 mm, the width (a) of the narrow gap being selected so that welding beads lying one above the other each extend over the entire width (a) of the narrow gap, and the entire narrow gap being fully automatically filled with the welding beads to said outer surfaces of the two metal parts.

2. The method as claimed in claim 1, wherein the relief region has a width (b) and a height (h), and the width (b) is about 3 times the height (h).

3. The method as claimed in claim 1, wherein the height of the narrow gap is 2 times the width (a), and is at least 12 mm.

4. The method as claimed in claim 1, wherein said tungsten inert welding comprises welding with a welding wire having a diameter between one-tenth and one-fifth of the width (a).

5. The method as claimed in claim 4, wherein the welding wire diameter is between 0.8 mm and 1.2 mm, and the metal parts to be joined are made of a rotor steel.

6. The method as claimed in claim 1, further comprising:
preheating the metal parts to elevated temperatures; and
wherein tungsten inert welding comprises welding with current intensities between 140 A and 300 A at a feed rate of 50 mm to 200 mm per minute, in dependence on the temperature of the metal parts from said preheating.

7. The method as claimed in claim 1, wherein preheating comprises heating the metal parts to above 200° C.

8. The method as claimed in claim 1, wherein tungsten inert welding comprising welding with inert gas selected from the group consisting of argon, argon with at most 3% hydrogen, an argon/helium mixture having 30-70% argon, remainder helium, and an argon/nitrogen/hydrogen mixture.

9. The method as claimed in claim 1, wherein tungsten inert welding comprising welding with inert gas of an argon/helium mixture having 50% argon and 50% helium.

10. The method as claimed in claim 1, wherein:
the metal parts are rotationally symmetrical;
the metal parts are arranged one above the other during said welding, and further comprising rotating the metal parts about a vertical axis; and
wherein welding comprises welding with a radially and vertically moveable welding tongue.

11. The method as claimed in claim 1, wherein the metal parts are rotationally symmetrical.

12. A device useful for joining two metal parts, the metal parts to be joined being capable of being rotated about a vertical axis, the device comprising:
a welding tongue configured and arranged to be automatically positioned and operated, the welding tongue comprising a narrow-gap welding torch and an integrated video system configured and arranged to monitor welding by video;
wherein the integrated video system comprises two video units, and wherein the welding tongue comprises a tungsten electrode arranged between said two video units so that the integrated video system can visually monitor the tungsten electrode, an arc, a molten bath, a welding wire supply, or flank wetting;
a wire-guiding system in the welding tongue configured and arranged to automatically supply welding wire;
wherein the welding tongue comprises a ceramic flat nozzle configured and arranged to supply inert gas;
means for determining the position of the welding tongue in the narrow gap arranged in the welding tongue, wherein the means for determining the position of the welding tongue comprises an integrated capacitive and a laser measuring system; and
wherein the welding tongue is configured and arranged to be automatically vertically and radially moved.

13. The device as claimed in claim 12, wherein the ceramic flat nozzle is configured and arranged for a minimum inert gas consumption of about 8 l/min.

14. The device as claimed in claim 12, wherein the integrated video system is positioned in the ceramic flat nozzle so that inert gas is simultaneously used for cooling the integrated video system.

* * * * *